US011660965B2

(12) United States Patent
Moriya et al.

(10) Patent No.: US 11,660,965 B2
(45) Date of Patent: May 30, 2023

(54) VEHICLE

(71) Applicant: SUBARU CORPORATION, Tokyo (JP)

(72) Inventors: Fumiyuki Moriya, Tokyo (JP); Kazuya Fuke, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 618 days.

(21) Appl. No.: 16/717,680

(22) Filed: Dec. 17, 2019

(65) Prior Publication Data

US 2020/0307382 A1 Oct. 1, 2020

(30) Foreign Application Priority Data

Mar. 27, 2019 (JP) .............................. JP2019-059633

(51) Int. Cl.
| | | |
|---|---|---|
| *B60L 1/00* | (2006.01) | |
| *B60L 50/64* | (2019.01) | |
| *B60L 58/12* | (2019.01) | |
| *B60L 53/22* | (2019.01) | |
| *B60L 53/16* | (2019.01) | |
| *B60L 53/66* | (2019.01) | |
| *B60L 53/18* | (2019.01) | |
| *H02P 27/06* | (2006.01) | |

(52) U.S. Cl.
CPC ............... *B60L 1/003* (2013.01); *B60L 1/006* (2013.01); *B60L 50/64* (2019.02); *B60L 53/16* (2019.02); *B60L 53/18* (2019.02); *B60L 53/22* (2019.02); *B60L 53/66* (2019.02); *B60L 58/12* (2019.02); *H02P 27/06* (2013.01)

(58) Field of Classification Search
CPC .......... B60L 1/003; B60L 53/22; B60L 50/64; B60L 53/66; B60L 58/12; B60L 53/16; B60L 53/18; B60L 1/006; H02P 27/06
USPC .......................................................... 701/22
See application file for complete search history.

(56) References Cited

U.S. PATENT DOCUMENTS

| | | | | |
|---|---|---|---|---|
| 5,656,916 A | * | 8/1997 | Hotta ...................... | B60L 53/14 320/109 |
| 9,048,050 B2 | * | 6/2015 | Kurita .................... | H01H 47/02 |

(Continued)

FOREIGN PATENT DOCUMENTS

| | | | | | |
|---|---|---|---|---|---|
| EP | 2423018 A1 | * | 2/2012 | ......... | B60H 1/00392 |
| EP | 3623199 A1 | * | 3/2020 | ................ | B60L 1/00 |

(Continued)

OTHER PUBLICATIONS

Japanese Office Action dated Nov. 29, 2022, in corresponding Japanese Patent Application No. 2019-059633, with an English translation thereof.

*Primary Examiner* — Suresh Memula
(74) *Attorney, Agent, or Firm* — McGinn I.P. Law Group, PLLC.

(57) ABSTRACT

A vehicle includes a battery, an electric power acquirer, a relay, a power supply unit, and a controller. The controller is able to switch a mode of electric power transmission to a direct transmission mode on the first condition that electric power is transmitted from the electric power acquirer to the battery and the power supply unit is in continuous operation or starts up. The direct transmission mode includes that the relay is in a disconnected state and electric power is transmitted from the electric power acquirer to the power supply unit.

20 Claims, 4 Drawing Sheets

(56) References Cited

U.S. PATENT DOCUMENTS

| | | | | |
|---|---|---|---|---|
| 9,340,090 B2* | 5/2016 | Fukatsu | ............... | B60L 53/62 |
| 9,776,519 B2* | 10/2017 | Chander | ............... | B60L 58/20 |
| 2009/0250278 A1* | 10/2009 | Kawasaki | ............... | B60K 6/543 |
| | | | | 903/910 |
| 2010/0121507 A1* | 5/2010 | Ishii | ............... | B60W 10/26 |
| | | | | 701/22 |
| 2012/0022744 A1* | 1/2012 | Endo | ............... | H01M 16/006 |
| | | | | 701/36 |
| 2012/0274277 A1* | 11/2012 | Masuda | ............... | B60L 53/14 |
| | | | | 320/109 |
| 2015/0175103 A1* | 6/2015 | Yamazaki | ............... | G01R 31/3278 |
| | | | | 701/29.1 |
| 2016/0193940 A1* | 7/2016 | Tashiro | ............... | B60L 58/20 |
| | | | | 903/907 |
| 2020/0247248 A1* | 8/2020 | Moriya | ............... | H02J 7/00034 |
| 2020/0247260 A1* | 8/2020 | Moriya | ............... | H02J 7/00712 |

FOREIGN PATENT DOCUMENTS

| | | |
|---|---|---|
| JP | 2013255345 | 12/2013 |
| JP | 2015104143 | 6/2015 |
| JP | 2018125901 | 8/2018 |
| WO | WO 2012/081104 A | 6/2012 |

* cited by examiner

VEHICLE

CROSS-REFERENCE TO RELATED APPLICATIONS

This application claims priority from Japanese Patent Application No. 2019-059633 filed on Mar. 27, 2019, the entire contents of which are hereby incorporated by reference.

BACKGROUND

The technology relates to a vehicle including a battery and an electric power acquirer that acquires electric power for battery charging from outside the vehicle.

Vehicles such as electric vehicles (EV) and plug-in hybrid electric vehicles (PHEV) include a battery and an electric power acquirer. The battery accumulates electric power for travel of a vehicle. The electric power acquirer is able to acquire charging electric power for the battery from outside. In such vehicles, utilities have been recently put into practical use. The utilities supply a power supply voltage to various electric devices with utilization of electric power of the battery. The utilities make it possible, for example, to drive an electric air conditioner of a vehicle, or to supply an AC power supply voltage from a power receptacle attached inside a vehicle cabin. The supply of the AC power supply voltage makes it possible to use, for example, a home electric appliance inside the vehicle cabin.

As to the related techniques, reference can be made to International Publication No. 2012/081104. International Publication No. 2012/081104 describes a vehicle that switches off a system main relay on predetermined conditions, to isolate a battery from a power line, in a case with charging of the battery concurrently with use of an electric load. In the vehicle of International Publication No. 2012/081104, the system main relay is turned off in order to prevent excessive discharging of the battery, in a case where the following conditions are satisfied: a state of charge (SOC) of the battery is low and a charging current of the battery is zero, or a current is being outputted from the battery.

SUMMARY

An aspect of the technology provides a vehicle including a battery, an electric power acquirer, a relay, a power supply unit, and a controller. The battery is configured to accumulate electric power for travel of the vehicle. The electric power acquirer is capable of acquiring, from outside the vehicle, charging electric power for the battery. The relay is configured to switch coupling between the battery and a power line of the vehicle. The power supply unit is capable of receiving electric power from the power line and supplying a power supply voltage to a device other than a traveling motor. The controller is configured to perform a control of electric power transmission through the power line. The controller is capable of switching a mode of the electric power transmission to a direct transmission mode on the first condition. The first condition includes that electric power is transmitted from the electric power acquirer to the battery and the power supply unit is in continuous operation or starts up. The direct transmission mode includes that the relay is in a disconnected state and electric power is transmitted from the electric power acquirer to the power supply unit.

An aspect of the technology provides a vehicle including a battery, an electric power acquirer, a relay, a power supply unit, and a controller. The battery is configured to accumulate electric power for travel of the vehicle. The electric power acquirer is capable of acquiring, from outside the vehicle, charging electric power for the battery. The relay is configured to switch coupling between the battery and a power line of the vehicle. The power supply unit is capable of receiving electric power from the power line and supplying a power supply voltage to a device other than a traveling motor. The controller is configured to perform a control of electric power transmission through the power line. The controller is capable of switching a mode of the electric power transmission to a direct transmission mode on a second condition. The second condition includes that electric power acquisition from the electric power acquirer becomes available while the power supply unit is in operation with electric power of the battery. The direct transmission mode includes that the relay is in a disconnected state and electric power is transmitted from the electric power acquirer to the power supply unit.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Some vehicles include a charging system that charges a battery using an external power supply. Such a charging system generally stops acquisition of charging electric power from the external power supply when the battery becomes fully charged. In vehicles including utilities, the use of the utilities is expected before and after the charging of the battery, or during the charging of the battery. With such expectation, when the battery becomes fully charged, the supply of the charging electric power from the external power supply is stopped. Thereafter, the utilities consume electric power of the battery, causing a decrease in a state of charge (SOC) of the battery. In a case where the SOC of the battery becomes equal to or lower than a predetermined value, the acquisition of electric power from the external power supply is restarted, causing the charging of the battery to full charge. In such a control method, long-time use of the utilities during the charging results in repetition of the discharging and the charging of the battery, contributing to early deterioration in the battery. A similar control may be possibly performed in the technique of International Publication No. 2012/081104 as well, in a case with the high state of charge of the battery.

It is desirable to provide a vehicle that makes it possible to suppress repetition of discharging and charging of a battery, in a case with electric power acquisition from an electric power acquirer concurrently with use of an electric load.

In the following, some preferred but non-limiting embodiments of the technology are described in detail with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a dimension of each of the elements, a material of each of the elements, a ratio between the elements, relative positional relationship between the elements, and any other specific numerical value are illustrative only and not to be construed as limiting to the technology. Further, elements in the following example embodiments which are not recited in a most-generic independent claim of the disclosure are optional and may be provided on an as-needed basis. Throughout the specification and the drawings, elements having substantially the same function and configuration are denoted with the same reference characters to avoid redundant description, and elements not in direct relation to the technology may not be illustrated.

Figure 1:
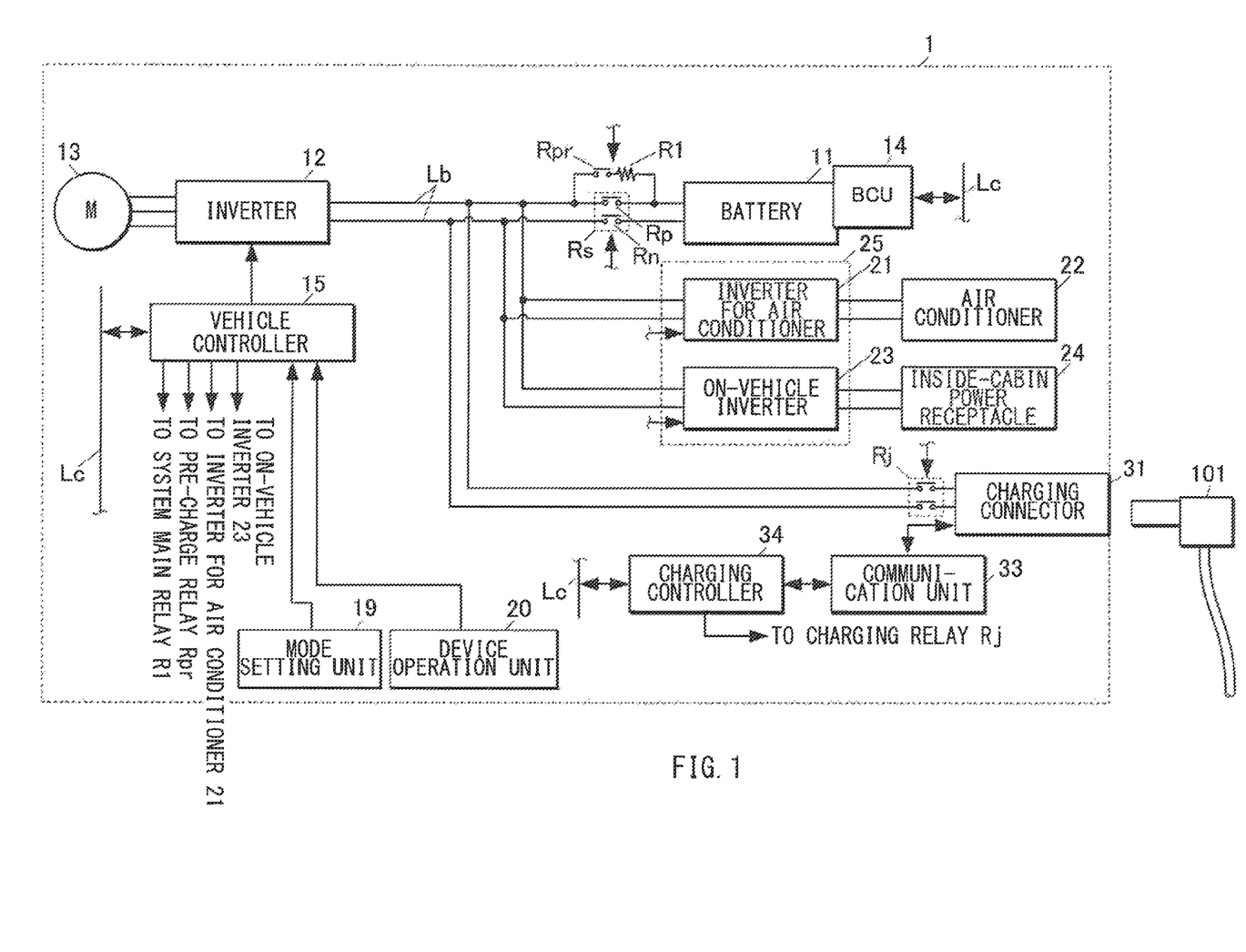
FIG. 1 is a block diagram illustrating a vehicle according to an embodiment of the technology.

FIG. 1 is a block diagram illustrating a vehicle according to an embodiment of the technology. A vehicle 1 according to the embodiment of the technology may be, for example, an automobile such as an EV and a PHEV. The vehicle 1 may include a battery 11, a traveling motor 13, an inverter 12, and a battery control unit (BCU) 14. The battery 11 may accumulate electric power for travel of the vehicle 1. The traveling motor 13 may drive a driving wheel. The inverter 12 may convert electric power between the battery 11 and the traveling motor 13. The BCU 14 may manage a state of the battery 11. The battery 11 may output a high voltage that drives the traveling motor 13 and may be referred to as a high-voltage battery. The battery 11 may include, for example, a secondary battery such as a lithium-ion storage battery or a nickel hydrogen storage battery.

The vehicle 1 may further include a system main relay Rs, a pre-charge relay Rpr, and a pre-charge device R1. The system main relay Rs may include a positive-electrode-side relay Rp and a negative-electrode-side relay Rn. The battery 11 may be coupled to a power line Lb through the system main relay Rs. In a case with the system main relay Rs in a disconnected state, the battery 11 and the power line Lb may be electrically disconnected in order to hinder a current flow therebetween. In a case with the system main relay Rs in a connected state, the battery 11 and the power line Lb may be electrically coupled in order to cause a current flow therebetween. The system main relay Rs being in the "connected state" means that both the positive-electrode-side relay Rp and the negative-electrode-side relay Rn are turned on. The system main relay Rs being in the "disconnected state" means that the positive-electrode-side relay Rp or the negative-electrode-side relay Rn, or both, are turned off.

In one embodiment of the technology, the system main relay Rs may serve as a "relay".

In a case with a great voltage difference between the power line Lb and the battery 11, the pre-charge relay Rpr and the pre-charge device R1 may perform pre-charging of the power line Lb or input capacitance of a device coupled to the power line Lb, causing a mild rise in a voltage of the power line Lb. The pre-charge device R1 may include, for example, a resistor.

The vehicle 1 may further include a power supply unit 25. The power supply unit 25 may supply a power supply voltage to an electric device other than the traveling motor 13. The power supply unit 25 may include, for example, subunits such as an inverter for air conditioner 21 and an on-vehicle inverter 23. The inverter for air conditioner 21 may convert electric power transmitted from the power line Lb and output driving electric power to an air conditioner 22, that is, for example, to a compressor. The on-vehicle inverter 23 may convert electric power transmitted from the power line Lb into an AC power supply voltage, and output the AC power supply voltage to an inside-cabin power receptacle 24. An occupant of the vehicle 1 may allow the on-vehicle inverter 23 to operate, and thereby be able to couple, for example, a home electric appliance to the inside-cabin power receptacle 24 and use the home electric appliance.

Instead of the inside-cabin power receptacle 24, or in addition to the inside-cabin power receptacle 24, a vehicle exterior power receptacle may be coupled to the on-vehicle inverter 23. The vehicle exterior power receptacle makes it possible to use an electric appliance near the vehicle 1, or outside a cabin of the vehicle 1. In another alternative, instead of the on-vehicle inverter 23, the power supply unit 25 may include a connector and a relay to which an external inverter may be coupled. Coupling the external inverter to the connector and turning the relay on causes electric power supply from the power line Lb to the inverter in accordance with a control by the vehicle controller 15, causing an AC power supply voltage to be outputted from the external inverter to the vehicle exterior power receptacle. With such a configuration, it is possible for a user of the vehicle 1 to use a home electric appliance near the vehicle 1.

The vehicle 1 may further include a vehicle controller 15. The vehicle controller 15 may perform a travel control of the vehicle 1 and a control of each part of the vehicle 1. The vehicle controller 15 may include a single electronic control unit (ECU), or alternatively, the vehicle controller 15 may include a plurality of ECUs that operate in cooperation with one another. The ECU may include a central processing unit (CPU), a storage, and a random access memory (RAM). The storage may hold control programs to be executed by the CPU and control data. The RAM is provided for expansion of data by the CPU.

The vehicle controller 15 may drive the inverter 12 in accordance with, for example, an operation of a driving operation unit, to cause powering operation or regenerative operation of the traveling motor 13. This leads to the travel of the vehicle 1 in accordance with a driving operation. In addition, the vehicle controller 15 may perform a switching control of the system main relay Rs and the pre-charge relay Rpr, a start-up and stop control of the subunits of the power supply unit 25, and a control of inputs from the occupant through a mode setting unit 19 and a device operation unit 20. Non-limiting examples of the inputs from the occupant through the device operation unit 20 may include a request for a start-up of the subunits of the power supply unit 25. The mode setting unit 19 is able to set a control mode of the vehicle. Non-limiting examples of the control mode to be set by the mode setting unit 19 may include a deterioration suppression mode. The deterioration suppression mode includes suppressing deterioration in the battery 11. The mode setting unit 19 and the device operation unit 20 may be located at a position where the occupant in a vehicle cabin is able to operate them, e.g., on a dashboard. It is to be noted that the mode setting unit 19 or the device operation unit 20, or both, do not have to be located in the vehicle cabin. Instead, adopted may be a configuration in which mode setting or a control of the subunits, or both, are available from a mobile device such as a so-called smartphone through telematics service.

The vehicle 1 may further include a charging connector 31, a communication unit 33, and a charging controller 34. The charging connector 31 is able to acquire charging electric power for the battery 11 from outside the vehicle 1. The communication unit 33 may perform communication with electric power transmission facilities outside the vehicle 1, through the charging connector 31. The charging controller 34 may perform a charging control of the battery 11. A charging relay Rj may be provided between the charging connector 31 and the power line Lb. The charging controller 34 may communicate with the BCU 14 and the vehicle controller 15 through a communication line Lc and perform the charging control of the battery 11 in cooperation with them. The charging controller 34 and the BCU 14 may include, for example, an ECU. The charging controller 34 is able to give the electric power transmission facilities a request for electric power transmission and a request for a stop of the electric power transmission, through the communication unit 33, with a charging plug 101 of the electric power transmission facilities coupled to the charging connector 31. The request for the electric power transmission may include, for example, a request to define magnitude of electric power and a request for a constant-voltage output. The charging controller 34 may perform switching of the charging relay Rj and give the electric power transmission facilities the request for the electric power transmission and the request for the stop, making it possible to switch between an output and a stop of a DC voltage from the charging plug 101, and to switch between an output and a stop of the DC voltage from the charging connector 31 to the power line Lb.

In one embodiment of the technology, the charging connector 31 may serve as an "electric power acquirer". In one embodiment of the technology, the vehicle controller 15 and the charging controller 34 may serve as a "controller".

It is to be noted that in the forgoing example of the charging connector 31, an example is given where the DC voltage may be inputted to the charging connector 31. Instead of the charging connector 31 as mentioned above, or in addition to the charging connector 31, provided may be an AC charging connector to which an AC voltage is inputted. In this case, a converter may be provided between the AC charging connector and the power line Lb. The converter may convert an AC power supply voltage into a DC voltage for the charging. The charging controller 34 may switch between a start-up and a stop of the converter, causing switching between an output and a stop of the DC voltage for the charging to the power line Lb.

<Deterioration Suppression Mode Processing>

Figure 2:
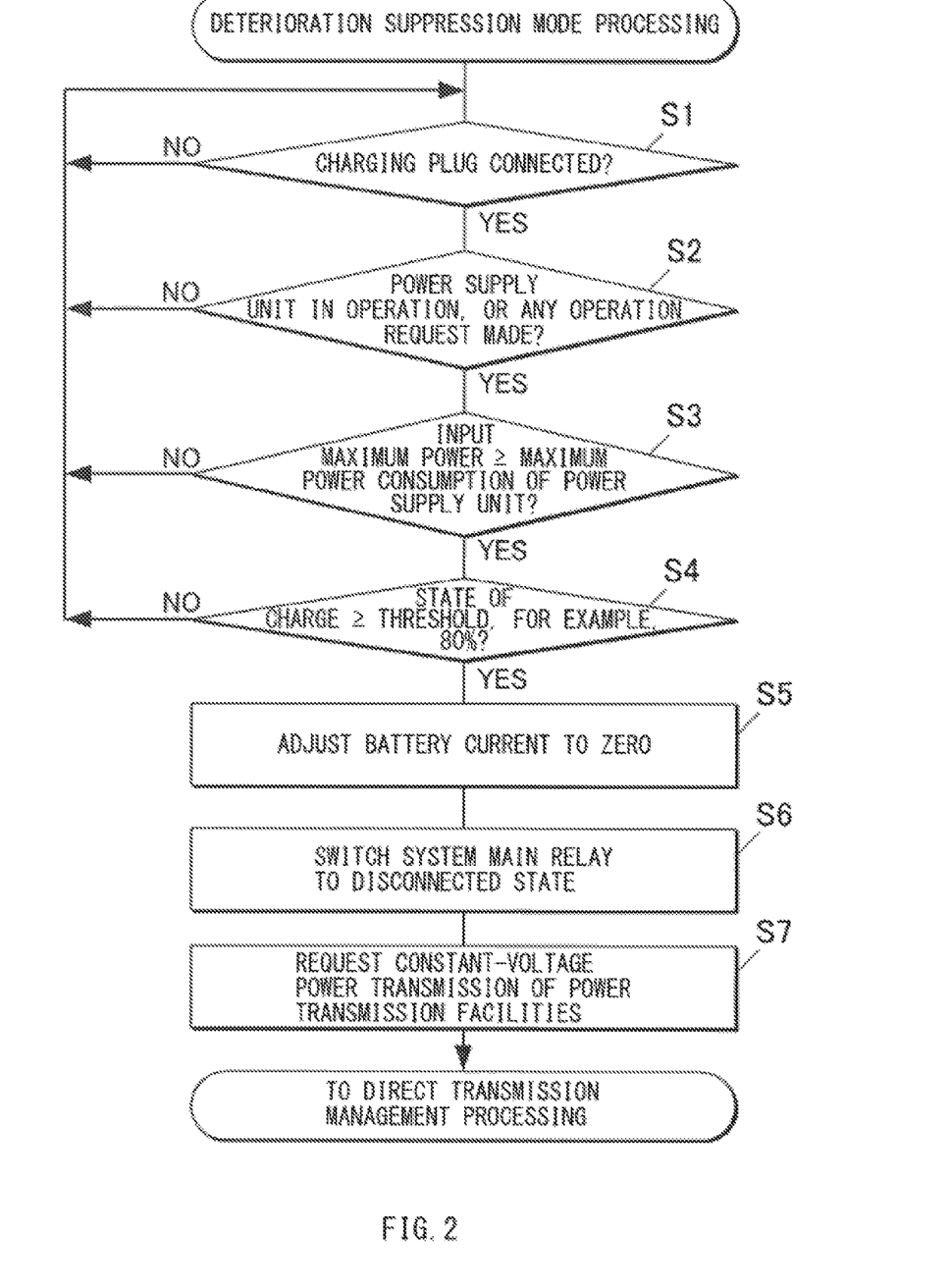
FIG. 2 is a flowchart illustrating a procedure of deterioration suppression mode processing to be executed by a vehicle controller according to the embodiment.

FIG. 2 is a flowchart illustrating a procedure of deterioration suppression mode processing to be executed by the vehicle controller 15. The vehicle controller 15 may execute the deterioration suppression mode processing, concurrently with other control processing, in a case where the deterioration suppression mode is set as the control mode of the vehicle 1, the vehicle 1 is stopped, and the system main relay Rs is in the connected state.

At the start of the deterioration suppression mode processing, the vehicle controller 15 may determine, through the charging controller 34, whether or not the charging plug 101 is coupled to the charging connector 31 (step S1). In addition, the vehicle controller 15 may determine whether the power supply unit 25 is in operation or whether any operation request is made (step S2). In a case with positive determination results for both steps S1 and S2 (steps S1 and S2: YES), the vehicle controller 15 may allow the processing to proceed. In a case with a negative determination result for step S1 or S2, or both (step S1 or S2, or both: NO), the vehicle controller 15 may return the processing to step S1.

Non-limiting examples of the case with the positive determination results for both steps S1 and S2 may include the following cases: a case where the user couples the charging plug 101 to the charging connector 31 while using the power supply unit 25 with electric power of the battery 11; a case where the user starts using the power supply unit 25 while charging the battery 11 with the charging plug 101 coupled; and a case where the user is using the power supply unit 25 while the charging the battery 11 with the charging plug 101 coupled.

In the case with the positive determination results for both steps S1 and S2 (steps S1 and S2: YES), the vehicle controller 15 may, next, compare input maximum power from the charging plug 101, with maximum power consumption of the power supply unit 25 in use or the operation-requested power supply unit 25 (step S3). The input maximum power may be acquired by, for example, the charging controller 34 communicating with the electric power transmission facilities. The maximum power consumption of the power supply unit 25 may be obtained from rated power of each of the subunits of the power supply unit 25. The rated power may be held in advance, as the control data, by the vehicle controller 15. As to the subunit whose power consumption varies with an electric device to be coupled to the relevant subunit, e.g., the on-vehicle inverter 23, the maximum power consumption may be defined by, for example, its rated capacity. As a result of the determination of step S3, in a case where the input maximum power is equal to or greater than the maximum power consumption of the power supply unit 25 (step S3: YES), the vehicle controller 15 may allow the processing to proceed. Otherwise (step S3: NO), the vehicle controller 15 may return the processing to step S1. It is to be noted that the maximum power consumption may be replaced with a value obtained by adding a margin to average power consumption.

As the processing progresses, the vehicle controller 15 may determine whether or not the state of charge of the battery 11 is equal to or higher than a threshold, e.g., 80%, that indicates a level at which the travel of the vehicle 1 is not hindered (step S4). Alternatively, the threshold may be a value indicating full charge, e.g., 100%. In a case with a positive determination result of step S4 (step S4: YES), the vehicle controller 15 may allow the processing to proceed. In a case with a negative determination result of step S4 (step S4: NO), the vehicle controller 15 may return the processing to step S1.

As the processing proceeds with the positive determination results of steps S1 to S4 (steps S1 to S4: YES), the vehicle controller 15 may adjust a current flowing through the battery 11 toward a decrease, e.g., to zero (step S5). This current adjustment processing may be made by, for example, giving a request of the electric power transmission facilities, through the charging controller 34 and the communication unit 33, to lower an output voltage of the electric power transmission facilities to an output voltage of the battery 11. In another alternative, the current adjustment processing may be made by, for example, performing adjustment of driving of a device coupled to the power line Lb, e.g., a heater, as follows. With the vehicle controller 15 provided with feedback of data regarding a charging current and a discharging current, the vehicle controller 15 may switch operation modes of the electric device coupled to the power line Lb, e.g., intensity of heating by the heater, to execute a feedback control to bring the charging current and the discharging current toward the decrease, e.g., to zero.

It is to be noted that the current value of the battery 11 to be targeted in the current adjustment processing in step S5 does not have to be zero insofar as the current value is small enough for the disconnection, or cutoff, of the system main relay Rs not to cause an adverse influence. With the current adjustment processing in step S5, it is possible to reduce the current value of the battery 11, as compared to a case without the current adjustment processing.

After reducing the current value of the battery 11 by the current adjustment processing, the vehicle controller 15 may switch the system main relay Rs to the disconnected state (step S6). Furthermore, the vehicle controller 15 may make the request of the electric power transmission facilities for the constant-voltage output, through the charging controller 34 and the communication unit 33 (step S7).

The switching of step S6 causes a mode of the electric power transmission through the power line Lb to make a transition to the direct transmission mode. The direct transmission mode includes transmitting electric power from the charging plug 101 to the power supply unit 25 without inputting electric power to the battery 11 nor outputting electric power from the battery 11. The request of step S7 causes the constant-voltage output from the charging plug 101. This allows an output of electric power from the charging plug 101 to follow variations in the power consumption of the power supply unit 25. Thereafter, the vehicle controller 15 may shift the processing to direct transmission management processing. The direct transmission management processing may include executing, for example, continuation of the direct transmission mode, a stop of the direct transmission mode, and switching to other transmission modes, in accordance with a state of each part.

<Direct Transmission Mode>

Figure 3:
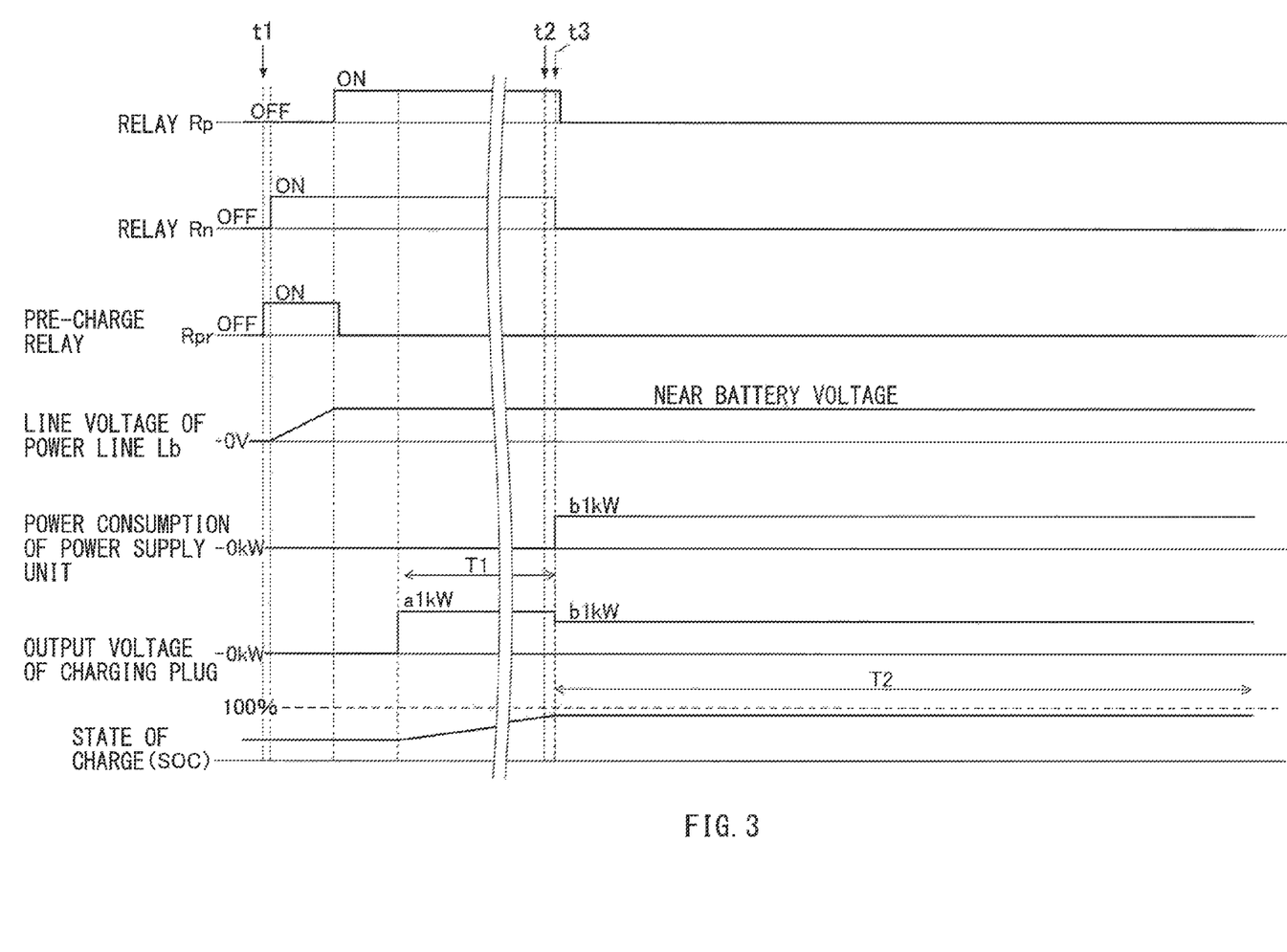
FIG. 3 is a time chart illustrating a state of each part, on a request for operation of a power supply unit in the course of charging, in the vehicle according to the embodiment.

FIG. 3 is a time chart illustrating the state of each part, on the request for the operation of the power supply unit 25 in the course of the charging, in the vehicle 1 according to this embodiment. This time chart illustrates an example of a control to be made by the deterioration suppression mode processing illustrated in FIG. 2.

With the charging plug 101 coupled to the charging connector 31, a charging request may be made at timing t1 through the device operation unit 20, and thereupon, first, the pre-charge relay Rpr and the negative-electrode-side relay Rn may be turned on, causing a rise in a line voltage of the power line Lb. Thereafter, the system main relay Rs may be switched to the connected state, and the request for the electric power transmission may be made of the electric power transmission facilities. Thus, the output of electric power may be made from the charging plug 101, causing the charging current to be inputted to the battery 11. As time passes, the state of charge (SOC) of the battery 11 rises (period T1).

In the middle of the charging, the user may make the request for the operation of the power supply unit 25 at timing t2 through the device operation unit 20, and thereupon, the positive determination results are obtained in steps S1 and S2 in the deterioration suppression mode processing in FIG. 2 (steps S1 and S2: YES). Thus, in the case where the conditions of steps S3 and S4 in FIG. 2 are satisfied, the vehicle controller 15 may adjust an input current and an output current, i.e., the charging current and the discharging current, of the battery 11 to zero, and thereafter, switch the system main relay Rs to the disconnected state at timing t3. In this way, the constant-voltage output is carried out from the charging plug 101, resulting in the direct transmission mode (period T2). In the direct transmission mode, electric power is transmitted from the charging plug 101 to the power supply unit 25, without the battery 11 being inputted with electric power nor outputting electric power.

Figure 4:
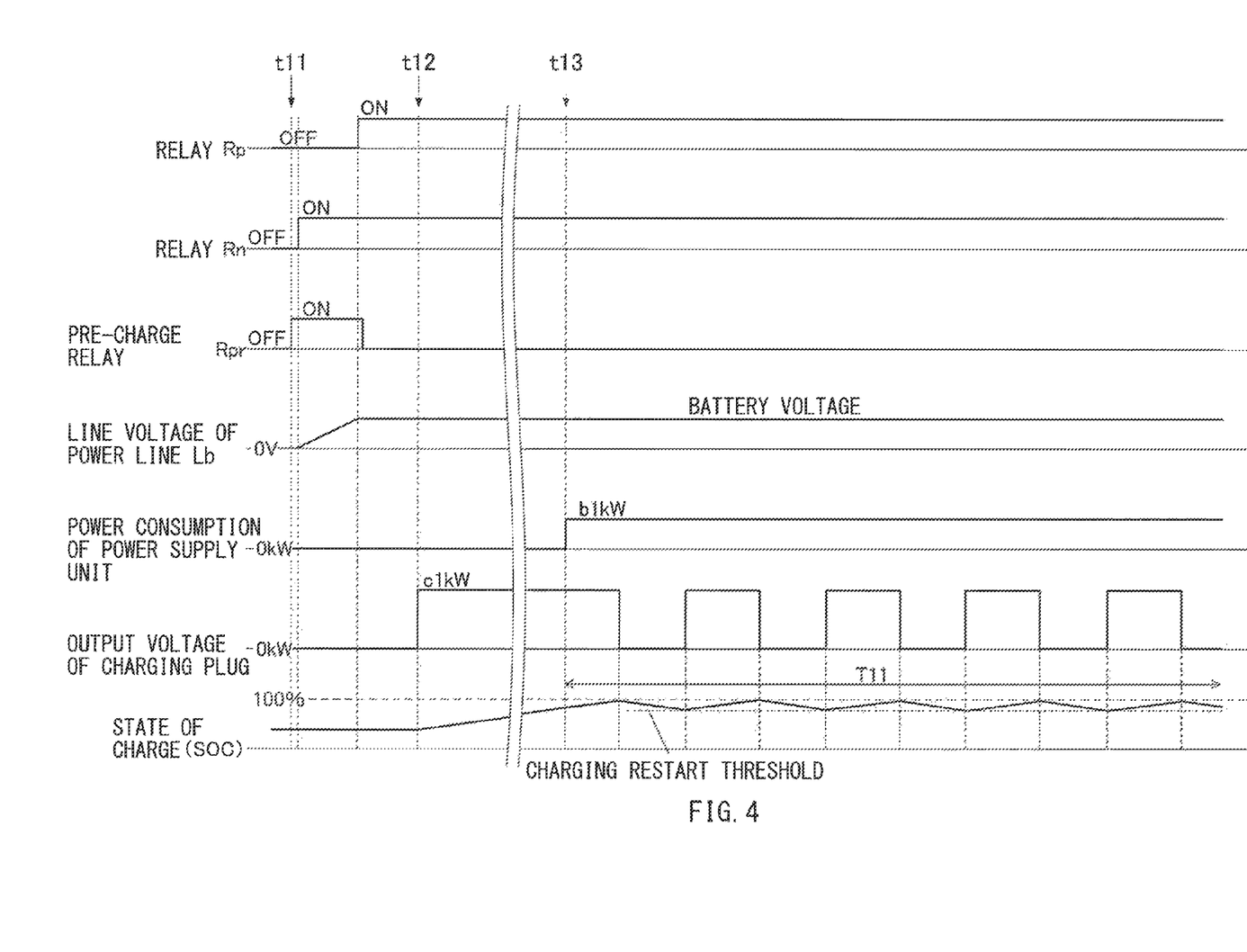
FIG. 4 is a time chart illustrating the state of each part, on the request for the operation of the power supply unit in the course of the charging, in a vehicle according to a comparative example.

FIG. 4 is a time chart illustrating the state of each part, on the request for the operation of the power supply unit 25 in the course of the charging, in a vehicle according to a comparative example. The vehicle according to the comparative example is configured to stop the output from the charging plug 101, in the course of the charging, when the battery 11 becomes fully charged, and is configured to restart the output from the charging plug 101 when the state of charge of the battery 11 becomes lower than a charging restart threshold.

In such a configuration, the charging request of the battery 11 is made (timing t11), and the charging of the battery 11 is started (timing t12). Thereafter, the request for the operation of the power supply unit 25 is made (timing t3), but the charging processing of the battery 11 still goes on. When the battery 11 becomes fully charged, the output from the charging plug 101 is stopped. Thereafter, electric power of the battery 11 is consumed by the power supply unit 25, causing the state of charge of the battery 11 to lower. When the state of charge of the battery 11 becomes lower than the charging restart threshold, the output from the charging plug 101 is restarted again, causing the battery 11 to be charged to full charge.

As described, in the configuration of the comparative example, the charging and the discharging of the battery 11 are repeated during a period T11 in which the power supply unit 25 operates in the course of the charging. This contributes to early deterioration in the battery 11. Meanwhile, in the vehicle 1 according to this embodiment, as illustrated in FIG. 3, the direct transmission mode prevents the repetition of the discharging and the charging of the battery 11 even when the power supply unit 25 is in operation. Hence, it is possible to suppress the early deterioration in the battery 11.

As described, according to the vehicle 1 of this embodiment, the vehicle controller 15 is able to switch the mode of the electric power transmission to the direct transmission mode, in the case where charging electric power is transmitted from the charging plug 101 to the battery 11 and the power supply unit 25 starts up or is in continuous operation. Moreover, according to the vehicle 1 of this embodiment, the vehicle controller 15 is able to switch the mode of the electric power transmission to the direct transmission mode, in the case where the power supply unit 25 operates with electric power of the battery 11 and the charging plug 101 is coupled to the charging connector 31. The switching to the direct transmission mode suppresses the repetition of the discharging and the charging of the battery 11 because of the electric power consumption of the power supply unit 25 and the electric power transmission from the charging plug 101. Hence, it is possible to suppress the early deterioration in the battery 11 because of significant variations in the state of charge of the battery 11 in the forgoing situation.

Furthermore, according to the vehicle 1 of this embodiment, in switching the mode of the electric power transmission to the direct transmission mode, the vehicle controller 15 may execute the current adjustment processing (step S5 in FIG. 2), and thereafter, the vehicle controller 15 may switch the system main relay Rs to the disconnected state. The current adjustment processing may include adjusting the current flowing through the battery 11 toward the decrease. Switching the system main relay Rs to the disconnected state, with a large current flowing through the system main relay Rs, may cause possibility that the system main relay Rs is damaged by, for example, a large surge voltage. With the current adjustment processing as mentioned above, it is possible to prevent the system main relay Rs from being damaged even in the case with the transition to the direct transmission mode with the battery 11 in the course of the discharging or the charging.

Moreover, according to the vehicle 1 of this embodiment, in the current adjustment processing (step S5 in FIG. 2), the vehicle controller 15 may request of the electric power transmission facilities to lower the output voltage, through the charging controller 34, and thereby reduce the current flowing through the battery 11. This makes it possible to reduce wasteful electric power consumption, leading to effective switching of the mode of the electric power transmission. Furthermore, according to the vehicle 1 of this embodiment, in the current adjustment processing (step S5 in FIG. 2), the vehicle controller 15 may switch the operation modes of the electric device coupled to the power line Lb, e.g., the intensity of the heating by the heater, to reduce the current flowing through the battery 11. This makes it possible to adjust the current with high responsiveness. Hence, it is possible to control, in the switching of the system main relay Rs, a current flowing through the system main relay Rs toward a decrease with high accuracy.

Furthermore, according to the vehicle 1 of this embodiment, the vehicle controller 15 may make the switching to the direct transmission mode in the case where the condition is satisfied that electric power acquirable from the charging plug 101 is larger than the electric power consumption of the power supply unit 25 (step S3: YES, in FIG. 2). In this configuration, the battery 11 is kept connected to the power line Lb in a case with the power supply unit 25 would have electric power shortage solely with electric power from the charging plug 101. Hence, it is possible to compensate the electric power shortage with electric power of the battery 11, leading to normal operation of the power supply unit 25.

Furthermore, according to the vehicle 1 of this embodiment, the vehicle controller 15 may make the switching to the direct transmission mode, in the case where the condition is satisfied that the state of charge of the battery 11 is equal to or greater than the threshold (step S4: YES, in FIG. 2). In this configuration, in the case with the low state of charge of the battery 11, the battery 11 is charged without the switching to the direct transmission mode. Hence, it is possible to avoid the situation that, for example, the charging plug 101 is coupled but the charging does not progress and the state of charge of the battery 11 is kept low, giving the user the sense of incongruity.

Furthermore, according to the vehicle 1 of this embodiment, the switching to the direct transmission mode may be made in the case where the deterioration suppression mode of the battery 11 is set as the control mode of the vehicle 1. Hence, it is possible for the user to select whether to give priority to the charging of the battery 11 or whether to give priority to the suppression of the deterioration in the battery 11, by the setting of the control mode of the vehicle 1.

Although some preferred but non-limiting embodiments of the technology are described above by way of example with reference to the accompanying drawings, the technology is by no means limited to the embodiments described above. It should be appreciated that modifications and alterations may be made by persons skilled in the art without departing from the scope as defined by the appended claims.

For example, a "power supply unit" of the technology is not limited to the configuration in FIG. 1, but may include, for example, a DC/DC converter or a relay. The DC/DC converter may output a DC voltage as a power supply voltage of a device coupled to the power supply unit. The relay may output the voltage of the battery as it is as the power supply voltage of the device coupled to the power supply unit.

Moreover, in the forgoing embodiment, the configuration is described, as an example, in which the transition to the direct transmission mode is available in the case with the deterioration suppression mode is selected. However, the transition to the deterioration suppression mode may be available whichever control mode of the vehicle 1 is selected.

Furthermore, in the forgoing embodiment, given is an example with the additional conditions of steps S3 and S4, as the conditions on which the transition to the direct transmission mode is made. However, the conditions of step S3 or S4, or both, may be omitted.

In addition, in the forgoing embodiment, an example is given in which in making the transition to the direct transmission mode, the current adjustment processing is executed, and thereafter, the system main relay Rs is switched to the disconnected state. The current adjustment processing may include reducing the input current and the output current, i.e., the charging current and the discharging current, of the battery 11. However, the current adjustment processing may be omitted in a case where the system main relay Rs has high durability.

Furthermore, in the forgoing embodiments, a "controller" of the technology is exemplified by the vehicle controller and the charging controller that cooperate with each other to perform the switching of the mode of the electric power transmission. However, the vehicle controller or the charging controller may perform the switching control of the mode of the electric power transmission, or alternatively, a dedicated controller may perform the switching control of the mode of the electric power transmission.

Moreover, the forgoing embodiments exemplify a configuration with an "electric power acquirer" of the technology configured to acquire electric power by wire. However, the "electric power acquirer" of the technology may be configured to acquire electric power wirelessly. In addition, the details described in the forgoing embodiments may be appropriately changed insofar as the changes fall within a range not departing from the scope of the technology.

According to the aspect of the technology, a controller is able to switch a mode of electric power transmission to a direct transmission mode, in a case where electric power acquisition from an electric power acquirer is performed concurrently with supply of a power supply voltage by a power supply unit. This switching allows a battery to be isolated from a power line, causing the electric power transmission from the electric power acquirer to the power supply unit. Hence, it is possible to suppress repetition of discharging and charging of the battery, in a case with electric power consumption of the power supply unit and the electric power acquisition from the electric power acquirer.

The vehicle controller 15 and the charging controller 34 illustrated in FIG. 1 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the vehicle controller 15 and the charging controller 34. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the vehicle controller 15 and the charging controller 34 illustrated in FIG. 1.

It should be appreciated that modifications and alterations may be made by persons skilled in the art without departing from the scope as defined by the appended claims. The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

The invention claimed is:

1. A vehicle, comprising:
a battery configured to accumulate electric power for travel of the vehicle;
an electric power acquirer configured to acquire, from outside the vehicle, charging electric power for the battery;
a relay configured to switch coupling between the battery and a power line of the vehicle;
a power supply unit configured to receive electric power from the power line and supplying a power supply voltage to a device other than a traveling motor; and
a controller configured to perform a control of electric power transmission through the power line,
the controller configured to switch a mode of the electric power transmission to a direct transmission mode on a first condition, the first condition including that electric power is transmitted from the electric power acquirer to the battery, and the power supply unit is in continuous operation or starts up, and the direct transmission mode including that the relay is in a disconnected state and electric power is transmitted from the electric power acquirer to the power supply unit.

2. The vehicle according to claim 1, wherein the controller switches the mode of the electric power transmission to the direct transmission mode, further on a third condition in addition to the first condition, the third condition including that electric power acquirable from the electric power acquirer is equal to or larger than electric power to be involved in the operation of the power supply unit.

3. The vehicle according to claim 1, wherein the controller switches the mode of the electric power transmission to the direct transmission mode, further on a fourth condition in addition to the first condition, the fourth condition including that a state of charge of the battery is equal to or greater than a predetermined threshold.

4. The vehicle according to claim 1, further comprising a mode setting unit able to set a control mode of the vehicle, wherein
the controller switches the mode of the electric power transmission to the direct transmission mode, further on a fifth condition in addition to the first condition, the fifth condition including that the control mode is a predetermined mode.

5. The vehicle according to claim 1, further comprising a mode setting unit able to set a control mode of the vehicle, wherein
the controller switches the mode of the electric power transmission to the direct transmission mode, further on a fifth condition in addition to the first condition, the fifth condition including that the control mode is a predetermined mode.

6. A vehicle, comprising:
a battery configured to accumulate electric power for travel of the vehicle;
an electric power acquirer configured to acquire, from outside the vehicle, charging electric power for the battery;
a relay configured to switch coupling between the battery and a power line of the vehicle;
a power supply unit configured to receive electric power from the power line and supplying a power supply voltage to a device other than a traveling motor; and
a controller configured to perform a control of electric power transmission through the power line,
the controller configured to switch a mode of the electric power transmission to a direct transmission mode on a second condition, the second condition including that electric power acquisition from the electric power acquirer becomes available while the power supply unit is in operation with electric power of the battery, and the direct transmission mode including that the relay is in a disconnected state and electric power is transmitted from the electric power acquirer to the power supply unit.

7. The vehicle according to claim 1, wherein the controller switches the mode of the electric power transmission to the direct transmission mode after performing current adjustment processing, the current adjustment processing including adjusting a current flowing through the battery toward a decrease.

8. The vehicle according to claim 7, wherein the current adjustment processing includes adjustment of an output of electric power transmission facilities to be coupled to the electric power acquirer.

9. The vehicle according to claim 7, wherein the current adjustment processing includes adjustment of driving of a device coupled to the power line.

10. The vehicle according to claim 7, wherein the controller switches the mode of the electric power transmission to the direct transmission mode, further on a third condition in addition to the first condition, the third condition including that electric power acquirable from the electric power acquirer is equal to or larger than electric power to be involved in the operation of the power supply unit.

11. The vehicle according to claim 7, wherein the controller switches the mode of the electric power transmission to the direct transmission mode, further on a fourth condition in addition to the first condition, the fourth condition including that a state of charge of the battery is equal to or greater than a predetermined threshold.

12. The vehicle according to claim 6, wherein the controller switches the mode of the electric power transmission to the direct transmission mode after performing current adjustment processing, the current adjustment processing including adjusting a current flowing through the battery toward a decrease.

13. The vehicle according to claim 12, wherein the current adjustment processing includes adjustment of an output of electric power transmission facilities to be coupled to the electric power acquirer.

14. The vehicle according to claim 12, wherein the current adjustment processing includes adjustment of driving of a device coupled to the power line.

15. The vehicle according to claim 12, wherein the controller switches the mode of the electric power transmission to the direct transmission mode, further on a third condition in addition to the second condition, the third condition including that electric power acquirable from the electric power acquirer is equal to or larger than electric power to be involved in the operation of the power supply unit.

16. The vehicle according to claim 12, wherein the controller switches the mode of the electric power transmission to the direct transmission mode, further on a fourth condition in addition to the second condition, the fourth condition including that a state of charge of the battery is equal to or greater than a predetermined threshold.

17. The vehicle according to claim 6, wherein the controller switches the mode of the electric power transmission to the direct transmission mode, further on a third condition in addition to the second condition, the third condition including that electric power acquirable from the electric power acquirer is equal to or larger than electric power to be involved in the operation of the power supply unit.

18. The vehicle according to claim 6, wherein the controller switches the mode of the electric power transmission to the direct transmission mode, further on a fourth condition in addition to the second condition, the fourth condition including that a state of charge of the battery is equal to or greater than a predetermined threshold.

19. The vehicle according to claim 6, further comprising a mode setting unit able to set a control mode of the vehicle, wherein
the controller switches the mode of the electric power transmission to the direct transmission mode, further on a fifth condition in addition to the second condition, the fifth condition including that the control mode is a predetermined mode.

20. The vehicle according to claim 6, further comprising a mode setting unit able to set a control mode of the vehicle, wherein
the controller switches the mode of the electric power transmission to the direct transmission mode, further on a fifth condition in addition to the second condition, the fifth condition including that the control mode is a predetermined mode.

* * * * *